US008228798B2

(12) United States Patent
Yegani et al.

(10) Patent No.: US 8,228,798 B2
(45) Date of Patent: Jul. 24, 2012

(54) QOS-AWARE SERVICE FLOW MAPPING IN MOBILE WIRELESS ALL IP NETWORKS

(75) Inventors: Parviz Yegani, Danville, CA (US); Anand K. Oswal, Sunnyvale, CA (US); Timothy P. Stammers, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 842 days.

(21) Appl. No.: 11/477,273

(22) Filed: Jun. 28, 2006

(65) Prior Publication Data

US 2008/0002592 A1    Jan. 3, 2008

(51) Int. Cl.
   *G08C 15/00*  (2006.01)
(52) U.S. Cl. .................... 370/235; 370/412
(58) Field of Classification Search .......... 370/252, 370/235, 349, 338, 354, 352, 230, 412, 429, 370/331, 248; 709/226, 223; 455/450
   See application file for complete search history.

(56) References Cited

U.S. PATENT DOCUMENTS

| 6,286,052 | B1 |   | 9/2001  | McCloghrie et al. |         |
|-----------|----|---|---------|-------------------|---------|
| 6,765,927 | B1 | * | 7/2004  | Martin et al.     | 370/469 |
| 6,888,807 | B2 | * | 5/2005  | Heller et al.     | 370/328 |
| 7,039,039 | B2 | * | 5/2006  | Cheong et al.     | 370/349 |
| 7,155,243 | B2 | * | 12/2006 | Baldwin et al.    | 455/466 |
| 7,738,378 | B1 | * | 6/2010  | Ho et al.         | 370/235 |
| 7,852,831 | B2 | * | 12/2010 | Akbar             | 370/352 |
| 2001/0027490 | A1 |   | 10/2001 | Fodor et al.   |         |
| 2003/0227880 | A1 |   | 12/2003 | Heller          |         |
| 2004/0047366 | A1 |   | 3/2004  | Chowdhury       |         |
| 2004/0109459 | A1 |   | 6/2004  | Madour et al.   |         |
| 2005/0220022 | A1 |   | 10/2005 | DelRegno et al. |         |
| 2006/0126547 | A1 |   | 6/2006  | Puuskari et al. |         |

FOREIGN PATENT DOCUMENTS

| CN | 101480002 A    | 7/2009  |
|----|----------------|---------|
| EP | 2 033 451      | 3/2008  |
| WO | WO 03/105442   | 12/2003 |
| WO | WO 2008/002604 | 1/2008  |

OTHER PUBLICATIONS

"cdma2000 Wireless IP Network Standard: Quality of Service and Header Reduction" Aquired at: http://www.3gpp2.org/Public_html/specs/X.S0011-004-D_v1.0_060301.pdf , 72 pages, 3GPP2 X.S0011-004-D, Version: 1.0, Version Date: Feb. 2006.
PCT International Search Report mailed Nov. 26, 2007 for PCT/US07/14899; 2 pages.

(Continued)

*Primary Examiner* — Chandrahas Patel
(74) *Attorney, Agent, or Firm* — Patent Capital Group

(57) ABSTRACT

In one embodiment, techniques provide QoS-aware service flow mapping in an access network. A message is received from an access device at a gateway in the access network. The message includes a traffic flow specification. The traffic flow specification may include packet filter information, which is used to install a packet filter to route traffic to the access device. The gateway creates a session and associates the packet filter with it. When an incoming packet is received at the network device, the packet is matched to the packet filter. The incoming packet is then sent to the access device for the session. The traffic flow specification may also specify QoS parameters that are desired. The QoS parameters may then be applied to the packet sent to the access device. The gateway and access device may negotiate to determine a QoS to apply.

16 Claims, 6 Drawing Sheets

OTHER PUBLICATIONS

PCT International Preliminary Report on Patentability and Written Opinion mailed Jan. 6, 2009 for PCT/US2007/014899; 5 pages.

PRC Jan. 27, 2011, "The First Office Action," CN Application Serial No. 2011012400578170, 31 pages.

Jun. 13, 2011 Response to PRC, "The First Office Action," mailed Jan. 27, 2011, CN Appliacation Serial No. 2011012400578170, 17 pages.

Tang Yong et al., "An Adaptive QoS Management Mechanism Based on IP Network," Chinese Journal of Computers, Jan. 31, 2001, 4 pages [Abstract Only].

EPO Nov. 4, 2011 Supplementary European Search Report and Opinion from EP Application Serial No. 07796500; 9 pages.

* cited by examiner

QOS-AWARE SERVICE FLOW MAPPING IN MOBILE WIRELESS ALL IP NETWORKS

BACKGROUND OF THE INVENTION

Embodiments of the present invention generally relate to networking and, more specifically, to service flow mapping in an access network.

Traffic flow specifications (TFS) are used to specify packet filter information that is used for flow mapping. A packet filter is installed and used to determine where to send incoming packets. This is independent of layer 2 protocols. Thus, the filters do not map to an access network that uses layer 2 (the data link layer) to send packets to a mobile station in a worldwide interoperability for microwave access (WiMAX) network. Typically, a certain quality of service (QoS) may be statically configured on a gateway in an access network. Accordingly, when packets are received for the mobile station, a certain QOS is applied as the packets are sent to the mobile station.

The above static configuration includes many disadvantages. For example, in WiMAX networks, a mobile station may roam to different networks. Thus, different gateways may be used to route packets to the mobile station. Accordingly, each of these gateways in the different networks needs to be statically configured to apply the correct QoS for the incoming packets for the mobile station. Because a mobile station may roam anywhere, statically configuring gateways to apply the correct QoS is burdensome and time-consuming.

DETAILED DESCRIPTION OF EMBODIMENTS OF THE INVENTION

Embodiments of the present invention provide QoS-aware service flow mapping in an access network. In one embodiment, a message is received from an access device at a gateway in the access network. The message includes a traffic flow specification. The traffic flow specification may include packet filter information, which is used to install a packet filter to route traffic to the access device. The gateway creates a session and associates the packet filter with it. When an incoming packet is received at the network device, the packet is matched to the packet filter. The incoming packet is then sent to the access device for the session.

The traffic flow specification may also specify QoS parameters that are desired. The QoS parameters may then be applied to the packet sent to the access device. In one embodiment, the gateway and access device may negotiate to determine a QoS to apply. For example, if the QoS is not supported by the gateway or cannot be applied at that time, the gateway and access device may negotiate to determine a second QoS to apply.

Accordingly, the access device may specify packet filter information and a QoS in a traffic flow specification. A packet filter is created and installed for the session and a QoS is dynamically applied. This allows dynamic configuration of a gateway using the traffic flow specification.

Figure 1:
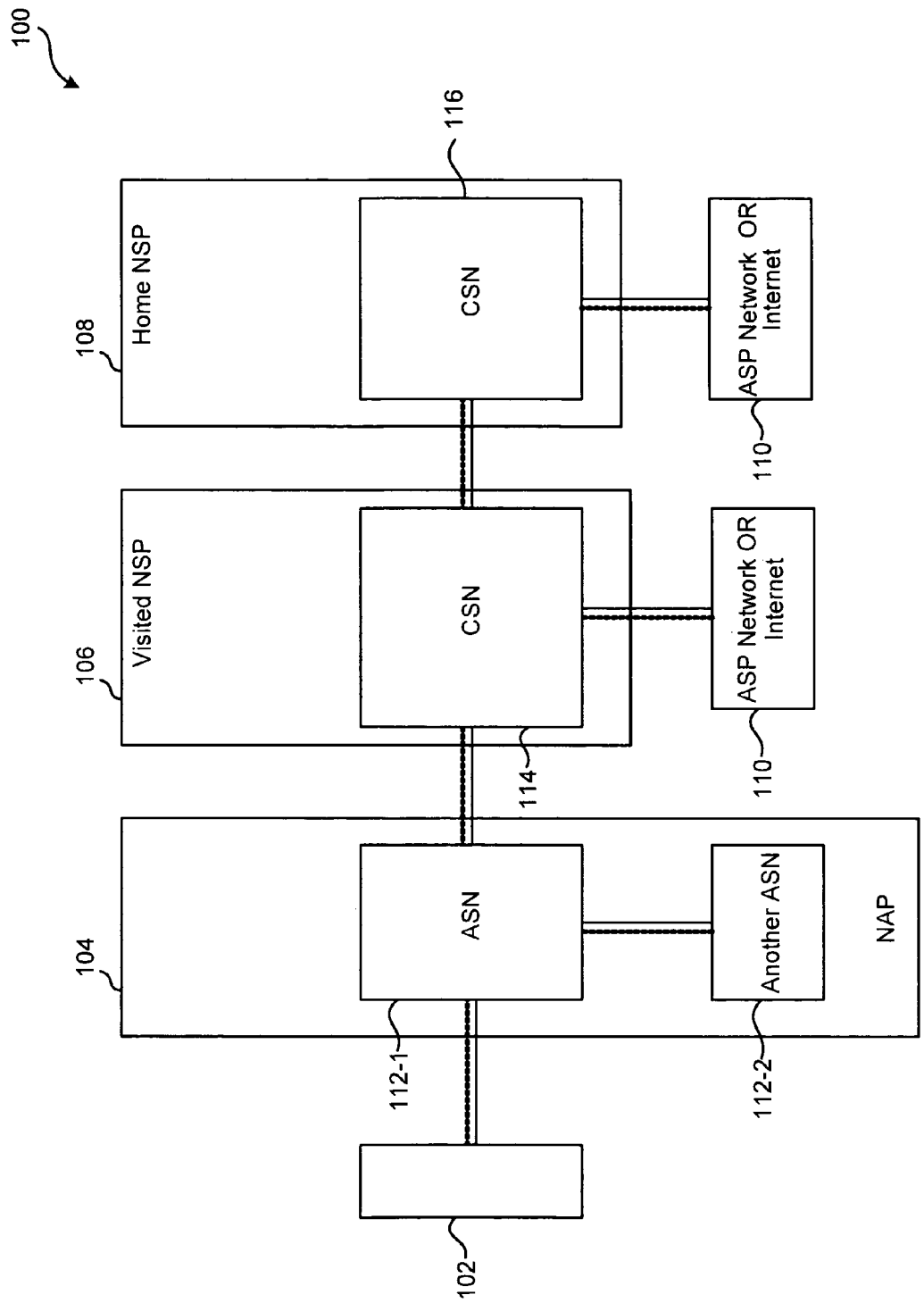
FIG. 1 shows a system depicts an example of a network according to one embodiment of the present invention.

FIG. 1 shows a system 100 depicts an example of a network according to one embodiment of the present invention. In one embodiment, system 100 includes a worldwide interoperability for microwave access (WiMAX) network. Although WiMAX may be described, it will be recognized that other wireless access networks may be appreciated in addition to other wire line networks and protocols.

System 100 includes an access device 102, network access provider (NAP) domain 104, a visited network service provider (NSP) domain 106, a home NSP domain 108, and application service provider (ASP) network 110. Although this system is described, it will be recognized that variations of system 100 will be appreciated.

Access devices 102 may be mobile devices or substantially stationary devices. For example, access device 102 may include a mobile station, subscriber station, laptop computer, cellular phone, personal digital assistant (PDA), Blackberry device, soft phone, set-top box, personal computers, etc. Also, access devices 102 may communicate through a wireless network, wire line network, or a combination of both.

NAP domain 104 includes access service networks 112. ASN 112 connects an access device through a base station to a service provider network. An access service network is a network that connects users to telecommunication service providers. It can be considered the route to the subscriber's home network or any other service provider network. For example, ASN 112 connects to a connectivity service network (CSN) 114 of visited NSP domain 106 or a CSN 116 of home NSP domain 108.

Access device 102 may connect to different ASNs 112 as it roams through NAP domain 104. For example, access device 102 may move from ASN 112-1 to ASN 112-2. This may occur as a user roams with access device 102 to different locations. When this occurs, ASN 112-1 may hand off the service to ASN 112-2.

CSN 116 is a network associated with a home network. For example, access device 102 may be associated with a home address in a home network. This is the base network for access device 102 and may be operated by a service provider. When the access device roams to other networks operated by different NSPs, then the access device accesses CSN 114 through visited NSP domain 106.

Access device 102 may access the Internet or other ASP networks 110 through CSN 114 and CSN 116. CSN 114 and CSN 116 are networks that provide the connectivity to the Internet, etc. Services may then be provided through ASP networks 110 and the Internet.

Figure 2:
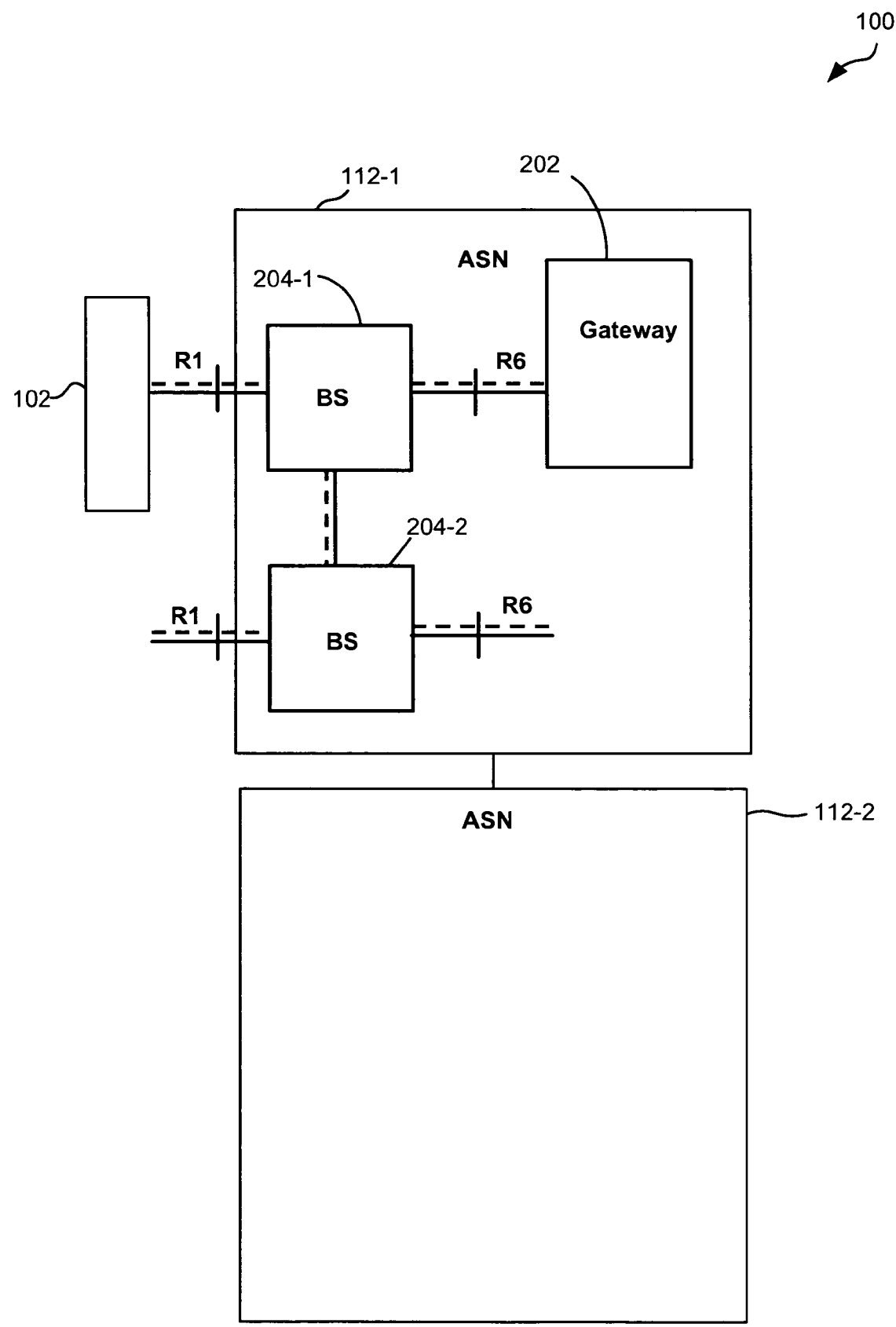
FIG. 2 depicts a more detailed embodiment of the system according to embodiments of the present invention.

FIG. 2 depicts a more detailed embodiment of system 100 according to embodiments of the present invention. As shown, ASN 112 includes a gateway 202 and multiple base stations 204.

Base stations 204 provide an access point to ASN 112. In one embodiment, a link R1 may be a wireless link. The link R1 may use wireless protocols and procedures, such as those provided in 802.16e. Other protocols may also be appreciated, such as 802.11x, and further enhancements to the 802.16 protocol and its successors will also be appreciated.

Gateway 202 may be a network device that is found in ASN 112. Gateway 202 is configured to communicate with home NSP 108 and/or visited NSP 106. Communications from access device 102 may flow through base station 204 to gateway 202. A link R6 between base station 204 and gateway 202 may be a wireless or wire line link. In one embodiment, a tunnel between base station 204 and gateway 202 may be established for communications.

Embodiments of the present invention allow access device 102 to send a traffic flow specification to gateway 202. The traffic flow specification includes packet filter information that may be used for flow mapping. A flow mapping is for a session that is created and packets are sent in the session to access device 102. The flow mapping includes a packet filter that is used to determine how to direct incoming packets. Further, the traffic flow specification may include QoS parameters requesting a certain QoS. In one embodiment, gateway 202 may negotiate with access device 102 to determine other QoS parameters that should be applied to the flow mapping.

Figure 3:
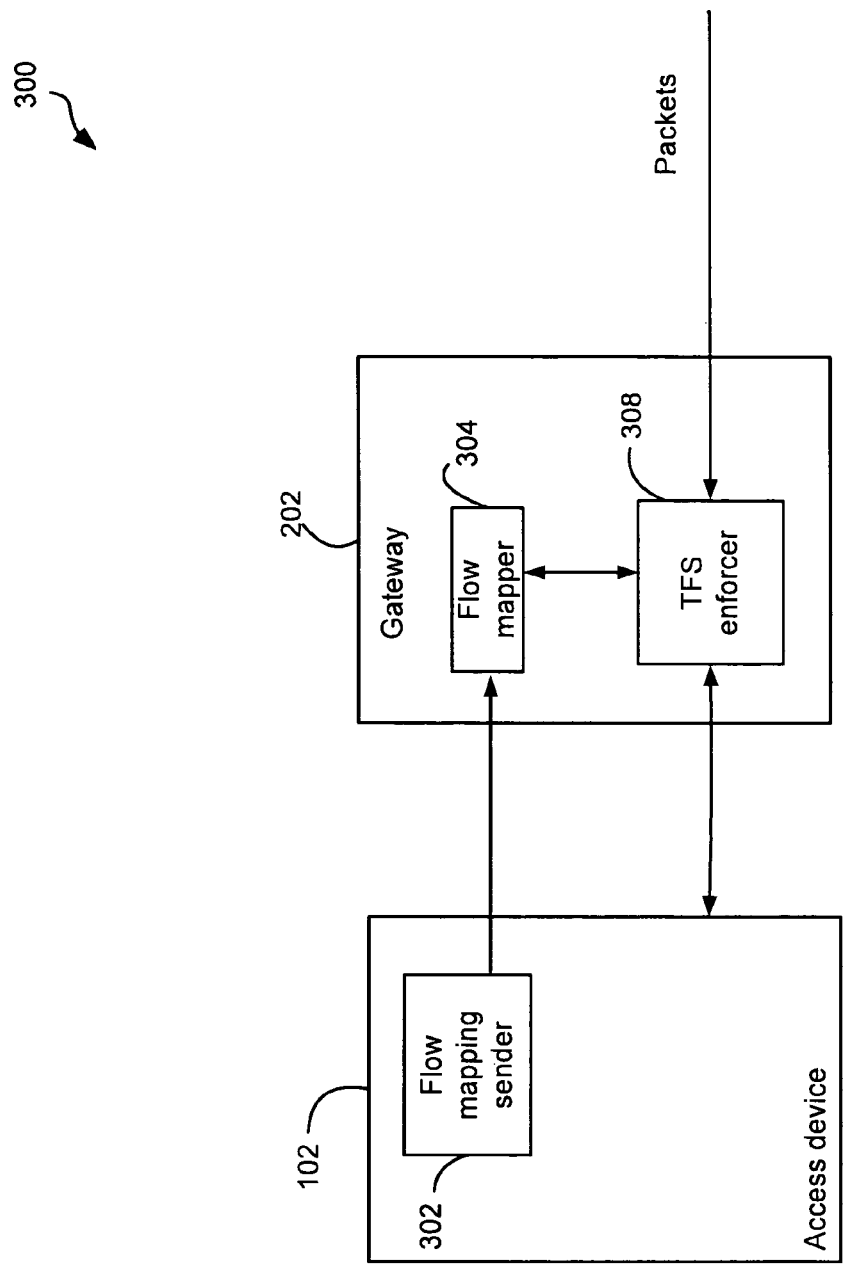
FIG. 3 depicts a more detailed embodiment of an access device and a gateway according to embodiments of the present invention.

FIG. 3 depicts a more detailed embodiment of access device 102 and gateway 202 according to embodiments of the present invention. As shown, access device 102 includes a flow mapping sender 302 that is configured to send a traffic flow specification to gateway 202. Signaling messages are used to send the traffic flow specification. In one embodiment, the signaling messages may be sent using a layer 3 protocol. For example, resource reservation protocol (RSVP) signaling messages are used to send a traffic flow specification. In one embodiment, RSVP extensions are used to carry information for the traffic flow specification. Although RSVP is described, it will be understood that other layer 3 protocols may be used to send the traffic flow specification.

A flow mapper 304 receives the signaling that includes the traffic flow specification. The signaling messages are sent end to end and may not be addressed to gateway 202 because gateway 202 is part of an access network. For example, the messages may be addressed to where the data is destined. However, gateway 202 intercepts the signaling messages and determines the traffic flow specification from the messages.

In one embodiment, the signaling messages are restricted to the access network. Thus, the signaling is between access device 102 and gateway 202. This is different from end-to-end RSVP messages that are sent using the layer 3 protocol. In this case, gateway 202 intercepts the messages. This minimizes changes to messages sent at layer 3 where the destination address of the message should be the same as the destination address of the data. In one example, the destination address does not have to be gateway 202 because this is a layer 3 protocol and the destination address is the destination for the data. This minimizes changes to the protocols such as RSVP by keeping the destination address of a PATH message the same as the destination address of the data. However, gateway 202 intercepts the messages and can determine the traffic flow specification from them.

Figure 4:
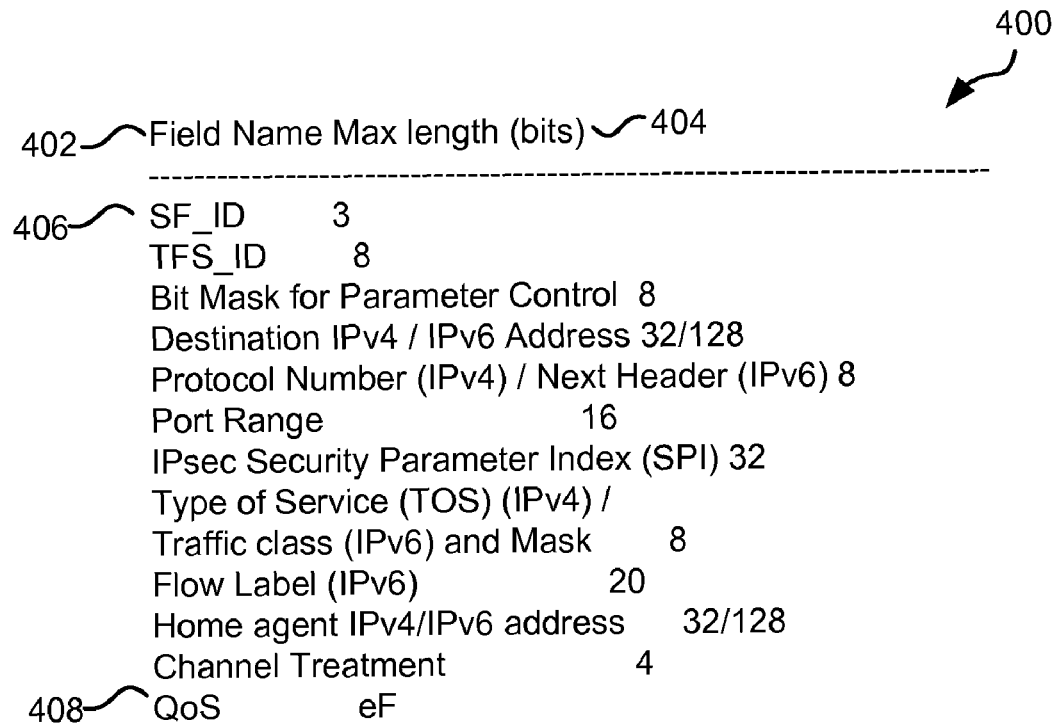
FIG. 4 shows an example of a traffic flow specification according to one embodiment of the present invention.

FIG. 4 shows an example of a traffic flow specification 400 according to one embodiment of the present invention. As shown, various fields 402 are provided in traffic flow specification 400. Fields 402 include values 404 that may be used to generate a packet filter for flow mapping. A SF_ID field 406 includes a parameter that is passed from lower layers to a higher layer (layer 3). The SF_ID is used to uniquely identify a given service flow when multiple simultaneous applications are running.

Other fields 402 are used to determine a packet filter (e.g., a 5-tuple). These parameters are used to uniquely identify IPv4 or IPv6 traffic streams.

A QoS field 408 includes one or more QoS parameters. For example, a requested QoS is included, such as EF (expedited forwarding). This allows access device 102 to request a QoS for a session. Although this traffic flow specification 400 is shown, it is understood that other specifications may be appreciated.

After intercepting the signaling messages, flow mapper 304 then determines if the elements in traffic flow specification 400 are acceptable. For example, any QoS parameters in the traffic flow specification that may not be acceptable are determined. In one embodiment, a user profile may have a QoS included in it. The user profile may have been received from home NSP 108. The request QoS is compared to the QoS in the user profile to determine if the requested QoS can be applied for access device 102. This allows gateway 202 to police requested QoSs to determine if a requested QoS should be awarded to access device 102.

If the QoS is not acceptable, flow mapper 304 may then engage in a negotiation with flow mapping sender 302 to determine acceptable QoS parameters (or any other elements of the traffic flow specification). The negotiation may use signaling messages that are sent back and forth between gateway 202 and access device 102.

In one example of a negotiation, access device 102 may send an RSVP message (e.g., a PATH message) that requires acknowledgement. The access device may include an RSVP-MESSAGE-ID object in the message and the ACK_Desired flag of the RSVP-MESSAGE-ID object is set. Access device 102 may set the refresh-reduction-capable flag in a common header of every RSVP message. When gateway 202 receives the RSVP message with the RSVP-MESSAGE-ID object, gateway 202 responds with an RSVP message that contains an RSVP-MESSAGE-ACK or RSVP-MESSAGE-(N)ACK object. The RSVP-MESSAGE-(N)ACK object may be piggy-backed onto standard RSVP messages but may be transmitted in an RSVP-ACK message if gateway 202 has no other RSVP message to send at the time. For example, gateway 202 should not delay processing of a received RSVP PATH message, but if it chooses to delay, it replies immediately with an RSVP-ACK message to be followed by an RSVP-RESP later, if necessary.

Once acceptable elements in a traffic flow specification are determined, a session and a packet filter for the session are created. The packet filter may be stored in a TFS enforcer 308. The packet filter is used to direct packets toward access device 102.

TFS enforcer 308 is configured to direct packets to access device 102 when they are received. In one example, when a packet is received, information in the packet is compared with packet filters stored in TFS enforcer 308. Gateway 202 may have created multiple sessions and each session may be associated with a packet filter. The session for the packet is determined by whichever packet filter the packet is matched to. In one embodiment, a packet filter may be a 5-tuple. Information in the packet (e.g., a packet header) is then compared with the 5-tuple. For example, IP addresses, port numbers, etc., in the packet header may be used to determine a match with a 5-tuple. If the information is determined to match the 5-tuple, then the packet is associated with that packet filter. The packet is then sent to access device 102 for the session that was created for the packet filter.

In one embodiment, a QoS is associated with the packet filter based on the traffic flow specification. The QoS may be provisioned on an access link based on various rules. Packets may be marked with a QoS marking that is used to classify the packet for QoS purposes. For example, a differentiated services code point (DSCP) may be mapped to an expedited forwarding (EF) QoS where the access link is an auxiliary access connection with the highest delivery priority associated with the access link with the lowest transport latency. The packet may be mapped to an assured forwarding (AFn) QoS with an access link for other auxiliary connections with medium or low priority delivery. Also, the packet may be mapped to a delayed tolerance service flow on to an access link with a best effort delivery option for another QoS. Other mappings will also be appreciated.

The dynamic configuration of flow mappings may be useful as access device 102 roams throughout a network. For example, when access device 102 connects to a second access service network, access device 102 may send a traffic flow specification to a second gateway 202-2. The correct packet filters and QoS may then be set up for access device 102. In this case, gateway 202-2 uses signaling from access device 102 to set up the packet filter and QoS. Accordingly, gateway 202-2 does not need to be statically configured to support sending packets to access device 102. Also, gateway 202-2 does not need to receive signaling from devices other than access device 102 (e.g., gateway 202-1) to set up the flow mapping for access device 102.

In one embodiment, access device 102 may have multiple sessions created in gateway 202 with different flow mappings. If a second session is desired, access device 102 may send signaling including a second traffic flow specification. A second packet filter may then be associated with the second session. Also, a second QoS may be applied to the second packet filter. In one example, access device 102 may have a data session and a VoIP session with each session requiring different QoS guarantees. When packets for the second session are received, TFS enforcer 308 matches information in the packet to a second 5-tuple for the packet filter. The packet is then sent using the second QoS. Thus, instead of having a static flow mapping for all incoming sessions, different flow mappings may be dynamically configured.

Figure 5:
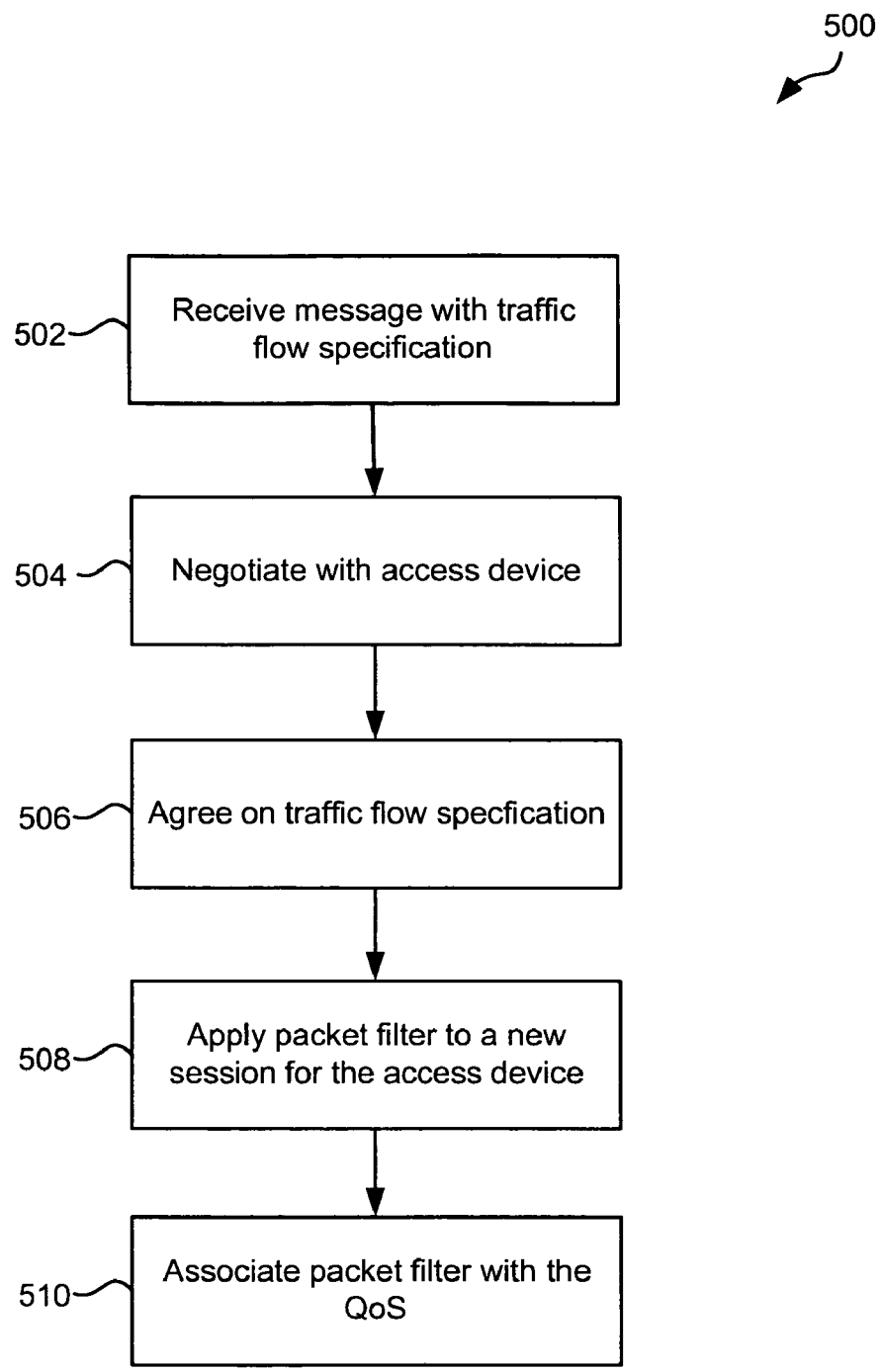
FIG. 5 depicts a simplified flowchart of a method for providing service flow mapping in accordance with one embodiment of the present invention.

FIG. 5 depicts a simplified flowchart 500 of a method for providing service flow mapping in accordance with one embodiment of the present invention. In step 502, a message is received at gateway 202 with a traffic flow specification. A message may be received in signaling from access device 102.

In step 504, gateway 202 may negotiate with access device 102 regarding elements in the traffic flow specification. For example, a re-proposal of a QoS level may be sent to access device 102. Access device 102 may then respond with an indication if that re-proposal is acceptable or may also propose another QoS.

In step 506, gateway 202 and access device 102 agree on elements in the traffic flow specification to apply to a session.

In step 508, a packet filter is applied to a new session for access device 102. In step 510, the packet filter may be associated with a specific QoS based on the negotiation described above.

Figure 6:
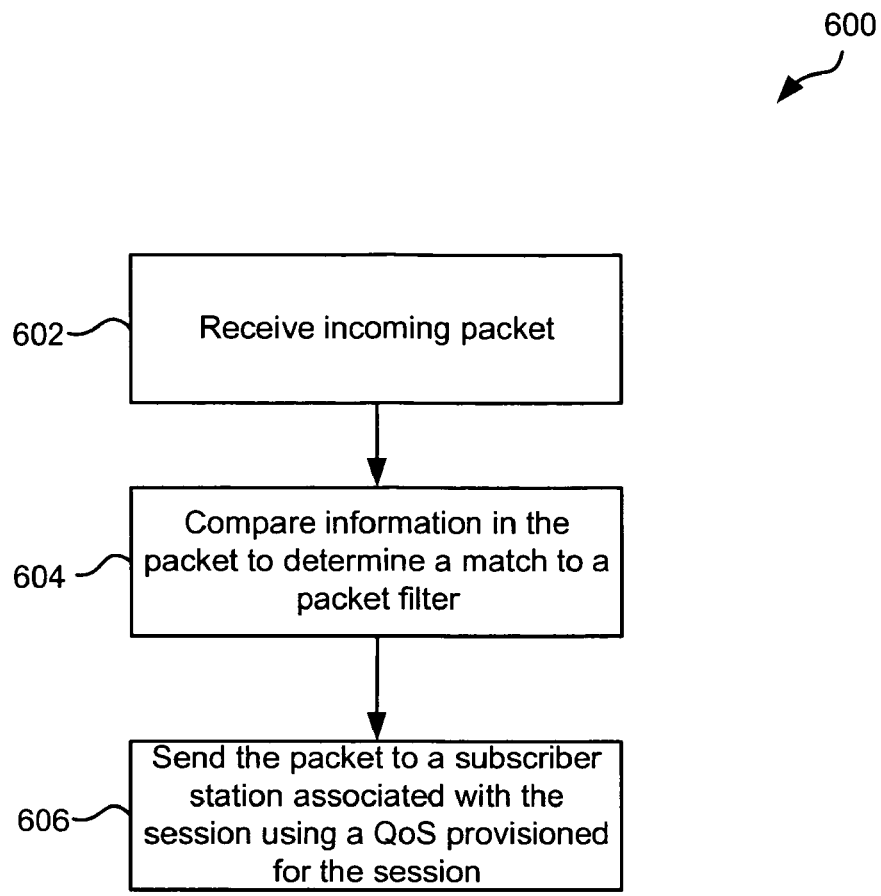
FIG. 6 depicts a simplified flow chart of a method for directing a packet to access device according to one embodiment of the present invention.

FIG. 6 depicts a simplified flow chart 600 of a method for directing a packet to access device 102 according to one embodiment of the present invention. In step 602, an incoming packet is received at gateway 202.

In step 604, gateway 202 compares information in the packet to a packet filter. For example, information in the packet is matched to a 5-tuple for the packet filter. When the packet filter is matched, then the session associated with the packet filter is determined in addition to which access device 102 in which to send the packet.

In step 606, the packet is sent to access device 102 based on the QoS provisioned for the session.

Although the invention has been described with respect to specific embodiments thereof, these embodiments are merely illustrative, and not restrictive of the invention. Although gateways and access devices are described, it will be recognized that these entities may be any network devices, such as router, switches, etc.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method comprising:

receiving a first resource reservation protocol (RSVP) message including a first traffic flow specification in an access network, wherein the first RSVP message is addressed to a destination of data in a first traffic flow that contains the first RSVP message and the first RSVP message is intercepted by a gateway in the access network to determine a quality of service (QoS) to apply to a first session created for the access device;

determining a first packet filter and a first QoS for the first traffic flow specification;

negotiating with an access device regarding the first traffic flow specification, wherein the first traffic flow specification includes the first QoS, and wherein the negotiating with the access device determines a second QoS to apply to the first session in response to the first QoS not being supported in a network in which the network device is operating;

associating the first packet filter and the second QoS with the first session created for the access device; and receiving a second RSVP message including a second traffic flow specification in the access network, wherein the second RSVP message is intercepted by the gateway in the access network to determine a third QoS to apply to a second session created for the access device, wherein the first session and the second session are concurrent.

2. The method of claim 1, further comprising:

communicating the second QoS to a second network when the access device connects to the second network.

3. The method of claim 1, wherein after the second QoS is determined, the session and the packet filter are created and stored in an enforcer.

4. The method of claim 3, wherein the first session is determined for a packet in a data flow by matching the packet to the packet filter.

5. The method of claim 1, further comprising:

receiving a third RSVP message from the access device at the network device in the access network, the third RSVP message including a third traffic flow specification;

determining a third session in which to associate a second packet filter for the third traffic flow specification;

receiving a packet at the network device;

determining that the packet is for the third session using the second packet filter; and sending the packet to the access device.

6. The method of claim 5, further comprising:

determining a fourth QoS to apply to the third session based on the third traffic flow specification; and applying the fourth QoS in sending the packet to the access device.

7. The method of claim 1, wherein the first packet filter comprises an N-tuple, the N-tuple determined based on the traffic flow specification.

8. The method of claim 1, wherein an identifier in the first traffic flow is used to uniquely identify the first traffic flow when simultaneous applications are running.

9. The method of claim 1, further comprising:
receiving incoming packets at the network device;
evaluating multiple active sessions associated with the access device; and
dynamically applying a different QoS for each of the sessions.

10. The method of claim 1, wherein the destination of the data in the first traffic flow is not the gateway.

11. The method of claim 1, wherein the first RSVP message requires an acknowledgement message and the acknowledgement message is piggy-backed onto a standard RSVP message.

12. A network device comprising:
one or more computer processors; and
a memory containing instructions that, when executed by the one or more computer processors, cause the one or more computer processors to perform:
receiving a first resource reservation protocol (RSVP) message including a first traffic flow specification in an access network, wherein the first RSVP message is addressed to a destination of data in a first traffic flow that contains the first RSVP message and the first RSVP message is intercepted by a gateway in the access network to determine a quality of service (QoS) to apply to a first session created for the access device;
determining a first packet filter and a first QoS for the first traffic flow specification;
negotiating with an access device regarding the first traffic flow specification, wherein the first traffic flow specification includes the first QoS, and wherein the negotiating with the access device determines a second QoS to apply to the first session in response to the first QoS not being supported in a network in which the network device is operating;
associating the first packet filter and the second QoS with the first session created for the access device; and
receiving a second RSVP message including a second traffic flow specification in the access network, wherein the second RSVP message is intercepted by the gateway in the access network to determine a third QoS to apply to a second session created for the access device, wherein the first session and the second session are concurrent.

13. The network device of claim 12, wherein the instructions cause the one or more computer processors to perform further steps comprising:
receiving a third RSVP message from the access device at the network device in the access network, the third RSVP message including a third traffic flow specification;
determining a third session in which to associate a second packet filter for the third traffic flow specification;
receiving a packet at the network device;
determining that the packet is for the third session using the second packet filter; and
sending the packet to the access device.

14. The network device of claim 13, wherein the instructions cause the one or more computer processors to perform further steps comprising:
determining a fourth QoS to apply to the third session based on the third traffic flow specification; and
applying the fourth QoS in sending the packet to the access device.

15. The network device of claim 12, wherein the first packet filter comprises an N-tuple, the N-tuple determined based on the traffic flow specification.

16. An apparatus comprising:
means for receiving a first resource reservation protocol (RSVP) message including a first traffic flow specification in an access network, wherein the first RSVP message is addressed to a destination of data in a first traffic flow that contains the first RSVP message and the first RSVP message is intercepted by a gateway in the access network to determine a quality of service (QoS) to apply to a first session created for the access device;
means for determining a first packet filter and a first QoS for the first traffic flow specification;
means for negotiating with an access device regarding the first traffic flow specification, wherein the first traffic flow specification includes the first QoS, and wherein the negotiating with the access device determines a second QoS to apply to the first session in response to the first QoS not being supported in a network in which the network device is operating;
means for associating the first packet filter and the QoS with the first session created for the access device; and
means for receiving a second RSVP message including a second traffic flow specification in the access network, wherein the second RSVP message is intercepted by the gateway in the access network to determine a third QoS to apply to a second session created for the access device, wherein the first session and the second session are concurrent.

* * * * *